United States Patent
Billet et al.

(10) Patent No.: US 8,913,741 B2
(45) Date of Patent: Dec. 16, 2014

(54) METHOD FOR PERFORMING A CRYPTOGRAPHIC TASK IN AN ELECTRONIC HARDWARE COMPONENT

(75) Inventors: Olivier Billet, Tourrettes sur Loup (FR); Henri Gilbert, Bures sur Yvette (FR); Gilles Macario-Rat, Vanves (FR)

(73) Assignee: France Telecom, Paris (FR)

( * ) Notice: Subject to any disclaimer, the term of this patent is extended or adjusted under 35 U.S.C. 154(b) by 52 days.

(21) Appl. No.: 13/262,349

(22) PCT Filed: Mar. 26, 2010

(86) PCT No.: PCT/FR2010/050561
§ 371 (c)(1),
(2), (4) Date: Sep. 30, 2011

(87) PCT Pub. No.: WO2010/112739
PCT Pub. Date: Oct. 7, 2010

(65) Prior Publication Data
US 2012/0020476 A1 Jan. 26, 2012

(30) Foreign Application Priority Data
Mar. 31, 2009 (FR) .................................... 09 52054

(51) Int. Cl.
*H04L 9/08* (2006.01)
*H04L 9/30* (2006.01)
*H04L 9/00* (2006.01)

(52) U.S. Cl.
CPC .......... *H04L 9/304* (2013.01); *G06F 2211/007* (2013.01); *H04L 9/3093* (2013.01); *H04L 9/002* (2013.01); *H04L 2209/16* (2013.01)
USPC .......................................................... 380/44

(58) Field of Classification Search
CPC ................ H04L 9/3026; H04L 9/3093; G06F 2211/007

USPC .......................................................... 380/44
See application file for complete search history.

(56) References Cited

U.S. PATENT DOCUMENTS

| | | | | |
|---|---|---|---|---|
| 5,613,005 | A * | 3/1997 | Murakami et al. .............. | 380/28 |
| 6,259,790 | B1 * | 7/2001 | Takagi et al. ................... | 380/30 |
| 7,551,740 | B2 * | 6/2009 | Lee et al. ....................... | 380/278 |

(Continued)

OTHER PUBLICATIONS

Jintai Ding Ed—Feng Bao et al. "A New Variant of the Matsumoto—Imai Cryptosystem through Perturbation" Feb. 26, 2004, Public Key Cryptography A PKC 2004: [Lecture Notes in Computer Science;;LNCS], Springer-Verlag, Berlin/Heidelberg, pp. 305-318, XP019002844.

Aline Gouget et al., "Probablistic Multivariant Cryptography" Jan. 1, 2007, Progress in Cryptology—Vietcrypt 2006 Lecture Notes in Computer Science;; LNCS, Springer, Berlin, DE, pp. 1-18, XP019053247.

(Continued)

*Primary Examiner* — Techane Gergiso
(74) *Attorney, Agent, or Firm* — David D. Brush; Westman, Champlin & Koehler, P.A.

(57) ABSTRACT

A method and apparatus are provided to perform a cryptographic task on at least one numerical datum in an electronic hardware component. The method includes a step of at least partial use of an encryption function. This encryption function includes a basic encryption function obtained by the addition between an intermediate function arising from composition of a coding function with a first function, and a second function. This method can be applied to the encryption of a datum or to the decryption of a datum. Also, a method is provided for generating a public key and a device able to implement one of these methods.

19 Claims, 9 Drawing Sheets

(56) References Cited

U.S. PATENT DOCUMENTS

| | | | |
|---|---|---|---|
| 2001/0012361 A1* | 8/2001 | Kasahara | 380/30 |
| 2003/0028842 A1* | 2/2003 | Katayama et al. | 714/781 |
| 2004/0078407 A1* | 4/2004 | Naslund et al. | 708/492 |
| 2004/0114484 A1* | 6/2004 | Sako et al. | 369/53.22 |
| 2006/0140401 A1* | 6/2006 | Johnson et al. | 380/44 |
| 2007/0014536 A1* | 1/2007 | Hellman | 386/94 |
| 2007/0016768 A1* | 1/2007 | Sonnekalb | 713/160 |
| 2008/0216051 A1* | 9/2008 | Johnson et al. | 717/110 |
| 2010/0020965 A1* | 1/2010 | Gueron et al. | 380/44 |
| 2010/0208885 A1* | 8/2010 | Murphy | 380/28 |
| 2010/0329447 A1* | 12/2010 | Akiyama et al. | 380/28 |
| 2012/0039463 A1* | 2/2012 | Gentry et al. | 380/28 |

OTHER PUBLICATIONS

Riek J. R. : "Observations on the Application of Error Correcting Codes to Public Key Encryption" 19901010; 19901010-19901012. Oct. 10, 1990, pp. 15-18, XP010079308.

"Chapter 8: Public Key Encryption ED—Menezes A; Oorschot Van P; Vanstone S" [Online] Oct. 1, 1996, Handbook of Applied Cryptography; [CRC Press Series on Discrete Mathematics and its Applications], CRC Press, Boca Raton, FL, US, pp. 283-319, XP001525008.

English Translation of the International Search Report and Written Opinion dated Jun. 7, 2010 for corresponding International Application No. PCT/FR2010/050561, filed Mar. 26, 2010.

* cited by examiner

METHOD FOR PERFORMING A CRYPTOGRAPHIC TASK IN AN ELECTRONIC HARDWARE COMPONENT

CROSS-REFERENCE TO RELATED APPLICATIONS

This application is a Section 371 National Stage Application of International Application No. PCT/FR2010/050561, filed Mar. 26, 2010 and published as WO 2010/112739 on Oct. 7, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of cryptography. Cryptography finds application in respect of the securing of transactions between two or more entities, by application of a cryptographic task. Included among these cryptographic tasks are the encryption of messages, electronic signature or even the authentication of messages. An encryption method consists essentially in encrypting a message in such a way that only the recipient can decrypt it. An electronic signature verification method consists essentially in verifying that a message is as it was signed by an entity that generated it. A message authentication method consists essentially in verifying that a message received was actually sent by a sending entity of known identity.

More precisely, the field of the disclosure is that of so-called public-key asymmetric cryptography. Public-key cryptography is particularly useful, for example for electronic payment, by bank card or by electronic purse. In the case of proximity payment, the payment terminal must on the one hand be situated in a public place, thus prompting the use of cryptography methods based on a public key, to avoid storing secrets therein. Moreover, the payment terminal must be cheap, thus prompting the use of processors with limited computational capabilities. In the case of on-line payment, the merchant server or the payment server (or else the intermediation server) is liable at certain times to be required to perform a large number of verifications simultaneously. In both cases it is desirable to find a solution making it possible to lighten the verification task, that is to say the cryptographic task which uses the public key.

BACKGROUND OF THE DISCLOSURE

For example, cryptographic encryption methods are known in which a first entity begins by encrypting a message by means of a public key. Only a second entity, that holds the private key associated with this public key, can then decrypt the message. Among known methods used for this kind of cryptographic task may be cited those based on the RSA (Rivest, Shamir, Adleman) algorithm or on the so-called discrete logarithm problem, involving elliptic curves.

The strength of such algorithms is based on the length of the secret key employed. Currently, for an RSA algorithm, it is usual to use secret keys of up to 2048 bits. This implies that these algorithms are rather slow to apply in practice. Moreover, the complexity curve of such algorithms as a function of the secret key is sub-exponential, which may turn out to be limiting in the future, and allow attackers to break such algorithms with advances in technology and computation speeds.

Finally, constrained environments such as RFID technology for example, offer only a limited implementation area and have energy constraints limiting their storage and execution capability. It is common to have microchips that have a thousand logic gates. However, if only in order to store an RSA number, it is necessary for there to be several tens of thousands of logic gates.

SUMMARY

An exemplary embodiment of the invention relates to a method for performing a cryptographic task on at least one numerical datum in an electronic hardware component, this method comprising a step of at least partial use of a cryptographic function, which comprises a basic encryption function obtained by the addition between an intermediate function derived from composition of a coding function with a first function, and a second function.

In a particular embodiment of the invention, the cryptographic function comprises an improved encryption function obtained by the composition of a concealment function with the basic encryption function. The use of such a concealment function makes it possible to prevent a possible attacker from easily decomposing the basic encryption function.

Preferably, the first function is a t-tuple of polynomial functions of degree greater than or equal to two and the second function is a polynomial function of degree greater than or equal to two.

Advantageously, the degree of the first polynomial function and the degree of the second polynomial function have the same value. This makes it possible to prevent a possible attacker from distinguishing the intermediate function from the second function by means of their reciprocal degrees.

In an advantageous manner, the intermediate function and the second function have the same expansion. This makes it possible to prevent a possible attacker from distinguishing the intermediate function from the second function by means of their reciprocal expansions.

Advantageously, the second function comprises a multiplication of a plurality of linear functions. This makes it possible to control the amount of noise added by the second function on the encryption function as a whole.

In one embodiment of the invention, the cryptographic task consists of an encryption of a datum, characterized in that said step of use is a step of encrypting the datum into an encrypted datum by means of said encryption function.

In another embodiment of the invention, the cryptographic task consists of a decryption of a basic encrypted datum, and the step of at least partial use then comprises a step of decoding the basic encrypted datum into an intermediate datum by way of a decoding function associated with the coding function, and a step of application of an inverse function of the first function to this intermediate datum so as to obtain a decrypted datum. Such an embodiment makes it possible to use an arbitrary second function to add noise to the encrypted datum.

In another embodiment of the invention, the task consists of a decryption of a datum to be decrypted, and the step of at least partial use comprises a step of obtaining of an intermediate datum by application of a decoding function, associated with the coding function, to the datum to be decrypted, and a step of application of the inverse function to the second function to this intermediate datum so as to obtain a decrypted datum. With such an embodiment, the first function does not necessarily have to be invertible.

In another embodiment, the task consists of a decryption of a basic encrypted datum, and the step of at least partial use then comprises a step of determination, by application of a decoding function, associated with the coding function, to the encrypted datum, of a plurality of potential pairs of elements, selection of a new pair of elements from among said plurality of potential pairs, computation of a candidate datum by application of an inverse function of the second function to the second element of the selected potential pair, computation of an intermediate datum by application of the first function to the candidate datum, comparison of the first element of the selected pair with the intermediate datum. If the first element and the intermediate datum are identical, the determination of the decrypted datum on the basis of the candidate datum is carried out, and if the first element and the intermediate datum are different, the method resumes with a new step of selection of a new pair of elements from among said plurality of potential pairs.

In an advantageous manner, the decryption method comprises a preliminary step of application of an inverse function of the concealment function to an improved encrypted datum so as to obtain the basic encrypted datum to be decrypted.

In another embodiment of the invention, the cryptographic task consists of an authentication, by a first entity, of an encrypted message sent by a second entity.

Another exemplary subject of the invention relates to a method for generating an asymmetric cryptography public key, comprising a step of composition of a first function with a coding function so as to obtain an intermediate function, and a step of addition of a second function to said intermediate function so as to obtain a basic public encryption function usable as public key.

In an advantageous manner, the generation method comprises an additional step of composition of a concealment function with the function generated by the method hereinabove, so as to generate an advanced public key. This makes it possible to strengthen the inviolability of the public key.

An exemplary embodiment of the invention relates, furthermore, to a cryptographic device comprising a computation module able to implement a method as described hereinabove.

BRIEF DESCRIPTION OF THE DRAWINGS

Other details and advantages will be better understood on the basis of examples of implementation whose description follows with reference to the appended drawings in which.

DETAILED DESCRIPTION OF ILLUSTRATIVE EMBODIMENTS

Figure 1:
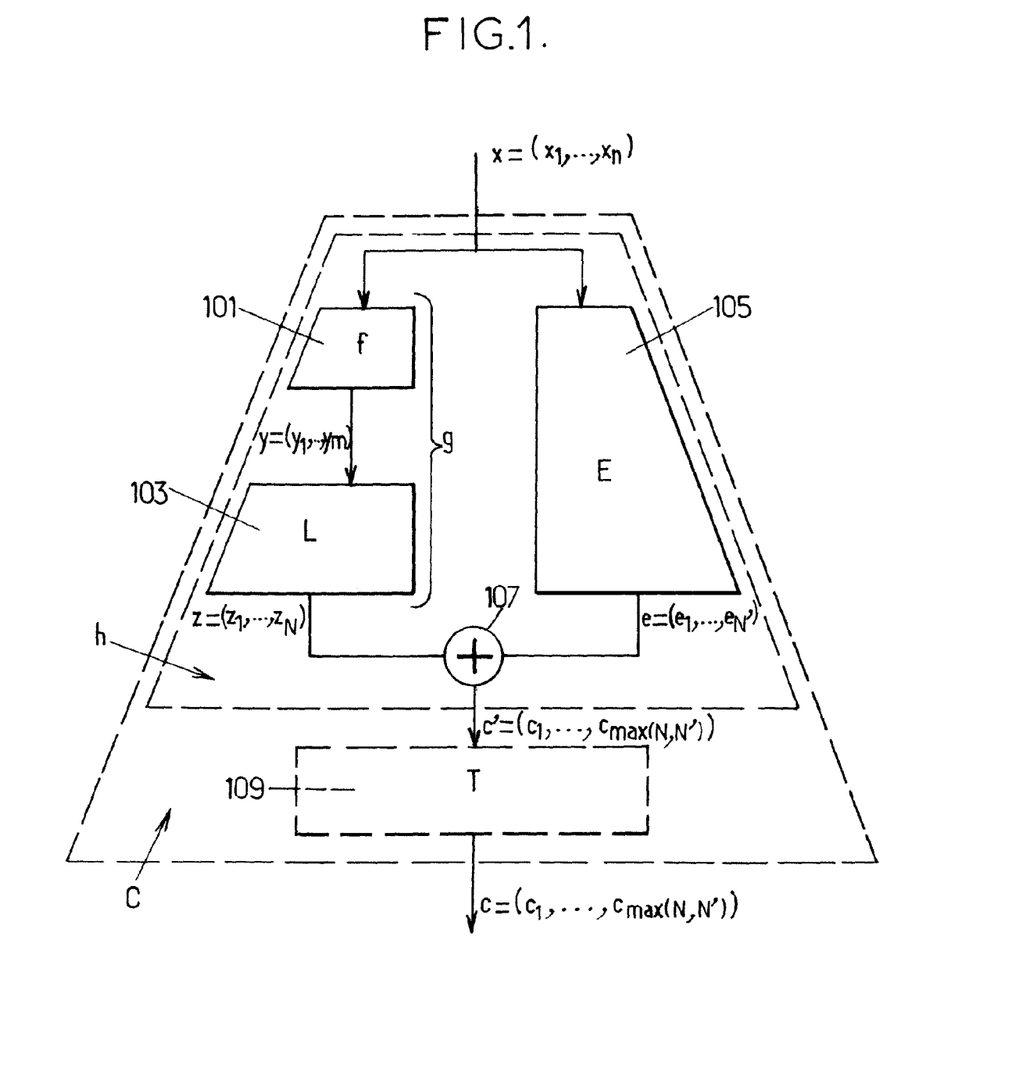
FIG. 1 illustrates the encryption function used to perform a cryptographic task according to an embodiment of the present invention.

FIG. 1 illustrates an encryption function that can serve as public key in a first embodiment of a method for performing a cryptographic task according to an embodiment of the present invention, in which the task consists in encrypting a datum x.

FIG. 1 more particularly describes the encryption function C used to allow the encryption of this datum x, which may be a vector numerical datum comprising a number n of components $x_1, \ldots x_n$, where $n \geq 1$. The components $x_i$ are chosen from a finite field K, so that x belongs to $K^n$. Such a field can consist of a Galois field, for example a Galois field of cardinal two GF(2), comprising only the two elements "0" and "1".

This encryption function C decomposes into three main components and an optional component. Its first component 101 consists of a function f, which associates a first intermediate datum y with the datum x. This datum y has a number m of components $y_1, \ldots, y_m$, where $m \geq 1$. If this number m is greater than the number n, one then speaks of expansion, quantified by a parameter $Exp(f)=m/n$. An exemplary function f consists of a system of m polynomial functions $f_i$, of degree $d_f$. Thus, with a datum x having n components $x_1, \ldots, x_n$ belonging to a field K, each of the m components $y_1, \ldots, y_m$ are computed by virtue of a polynomial function $f_i$ of degree $d_f$. For example, if this degree $d_f$ equals two, that is to say if the system f is quadratic, it then comprises a set of quadratic polynomial functions $f_i$ and the components $y_i$ comply with the following equation:

$$y_i = f_i(x_1, \ldots, x_n) = \sum_{j=1}^{n}\sum_{k=1}^{n} \alpha_{i,j,k} x_j x_k + \sum_{l=1}^{n} \beta_{i,l} x_l + \gamma_i \quad (1)$$

The coefficients $\alpha_{i,j,k}$, $\beta_{i,l}$ and $\gamma_i$ may be chosen from the field K. One speaks here of a quadratic multivariate system. A quadratic system such as this is advantageous, with respect to a system of degree $d_f$ greater than two, since the complexity, therefore the necessary computational resources, increases exponentially with the degree $d_f$ of the system. A quadratic multivariate system such as this can originate from a public key for a multivariate cryptosystem, for example.

The second component 103 of the encryption function C consists of a coding function L to be applied to the intermediate datum y derived from the first function f. This coding function L will associate with the first intermediate datum a second intermediate datum z comprising a number N of components $z_1, \ldots, z_N$, where $N \geq 1$, and makes it possible to add redundancy to the intermediate datum y so as to render it more resistant to noise or other errors which could be added thereto. Such a coding function L can consist of a system of N polynomial functions $L_i$ of degree $d_L$. Thus, with a datum y having m components $y_1, \ldots, y_m$, this function L will map the datum y to a datum z having N components $z_1, \ldots, z_N$ each computed by virtue of a polynomial function $L_i$ of degree $d_L$. The components $z_i$ then comply with the following equation, in the purely illustrative case of a degree $d_L$ equal to two:

$$z_i = L_i(y_1, \ldots, y_m) = \sum_{j=1}^{m}\sum_{k=1}^{m} a_{i,j,k} y_j y_k + \sum_{l=1}^{n} b_{i,l} y_l + c_i \quad (2)$$

Stated otherwise, the second intermediate datum z is derived from the datum x to which is applied a function g, composed of the coding function L compounded with the first function f, according to:

$$z = L \cdot f(x) = g(x) \quad (3)$$

A linear coding function L, that is to say of degree $d_L$ equal to one, is here particularly advantageous in terms of complexity. With a quadratic multivariate system f, therefore of degree two, compounded with a linear function L, therefore of degree one, the resulting function g as a degree $d_h$ of two, advantageous in terms of computational complexity.

Such a coding function customarily finds its application in error correction, and the function L can thus consist of an error-correcting code, such as for example a BCH code, a Goppa code, or else a Reed-Solomon code.

The third component 105 of the encryption function C consists finally of a second function E, likewise applied to the datum x to be encrypted. The underlying idea is to add elements, such as for example noise or randomness that one knows how to control, into the global encryption function C, which may be used as a public key in an asymmetric cryptography system. This second function E can consist, for example, of a random function or of a system of N' polynomial functions $E_i$ of degree $d_E$. In the latter case, still with the datum x having n components $x_1, \ldots, x_n$, this function E will map to the datum x a datum e, that may be regarded as an "error datum", having N' components $e_1, \ldots, e_{N'}$, each computed by virtue of a polynomial function Ei of degree $d_E$. The expansion of this function E then equals Exp(E)=N'/n and the components $e_i$ of the error datum e then comply with the following equation, in the nonlimiting case of a degree $d_E$ equal to two:

$$e_i = E_i(x_1, \ldots, x_n) = \sum_{j=1}^{N'} \sum_{k=1}^{N'} A_{i,j,k} x_j x_k + \sum_{l=1}^{N'} B_{i,l} x_l \quad (4)$$

The compound function g and the second function E are then added together to form a basic encryption function h complying with the following equation:

$$h = L \cdot f + E \quad (5)$$

A basic encryption function h such as this can serve as public key, in which case, when this public key is used to encrypt a datum x, the resulting basic encrypted datum c', as illustrated in FIG. 1, equals:

$$c' = g(x) = L \cdot f(x) + E(x) \quad (6)$$

The degree $d_g$ of the compound function g and the degree $d_E$ of the function E are not necessarily identical. If they are different, a malicious user may attempt to use this difference to differentiate the function g from the function E, by deducing by attack-tests the degrees of the resulting polynomial function which belong to one or the other of these functions. In order to render this task more arduous, the degrees $d_g$ and $d_E$ are chosen identically, for example equal to two, in an advantageous embodiment.

The same reasoning applies as regards the expansion conferred by the functions g and E, characterized respectively by the parameters Exp(g)=N/n and Exp(E)=N'/n, which are not necessarily identical. If for example N' is less than N, that is to say if the error datum e exhibits fewer components than the second intermediate datum z, certain components $c_i'$ of the resulting basic encrypted datum will not comprise any error components $e_i$, and a malicious user will be able to deduce this by attack-tests. It is therefore advantageous to choose parameters N and N' of the same value, so that the compound function g and the function E involve the same degree of expansion on the datum x.

In a particular embodiment of the invention, an optional component 109 consisting of an additional concealment function T is applied to the basic encrypted datum c' so as to obtain an advanced encrypted datum c, according to:

$$c = T(c') = T \cdot (L \cdot f(x) + E(x)) \quad (7)$$

The advanced global encryption function C is then composed in the following manner:

$$C = T \cdot (L \cdot f + E) \quad (8)$$

The use of an additional concealment function T such as this makes it possible to strengthen the resistance of the encryption to possible attacks. Indeed, with the basic encryption function h as presented in equation (5), the possibility exists that a malicious user can attempt to distinguish the component L·f (the left branch of FIG. 1) from the component E (the right branch of FIG. 1), by performing for example attack-tests. The addition of a new encryption layer, with the additional function T, makes it possible to prevent this distinction since the elements derived from each of the branches of FIG. 1 will then be indissociable after application of the concealment function T. This makes it possible furthermore to be able to render the coding function L public. Such a function T, when it is employed, must be reversible so as to allow an advanced decryption subsequently.

The basic encryption function h, or the advanced encryption function C, constructed in the manner described hereinabove, can then serve as public key in an asymmetric cryptography system. Thus, still referring to FIG. 1, a basic public key h may be generated by virtue of a generation method comprising a step of compounding the first function f with a coding function L so as to obtain a first intermediate function g, followed by a step of adding the second function E to said intermediate function g. An advanced public key C can also be generated, by compounding a concealment function T with the basic public key h such as generated hereinabove.

A public key such as this can be made available to a recipient so that the latter may perform a cryptographic task by means of this public key, without him having knowledge of the individual functions f, L, E (and optionally T). The secret key associated with this public key then consists in the knowledge of the individual functions f, L, E (and optionally T) which will serve to decrypt data that are encrypted by means of the public key.

In a first embodiment of the encryption method, the first function f is an invertible function, preferably quadratic, that is to say consisting of a system of polynomials $f_i$ of degree 2. The second function E, for its part, can take the form of a random function, that is to say for example the form of a system of polynomials whose coefficients take values chosen randomly from among the elements of the field K employed for the variables $x_i$.

Figure 2A:
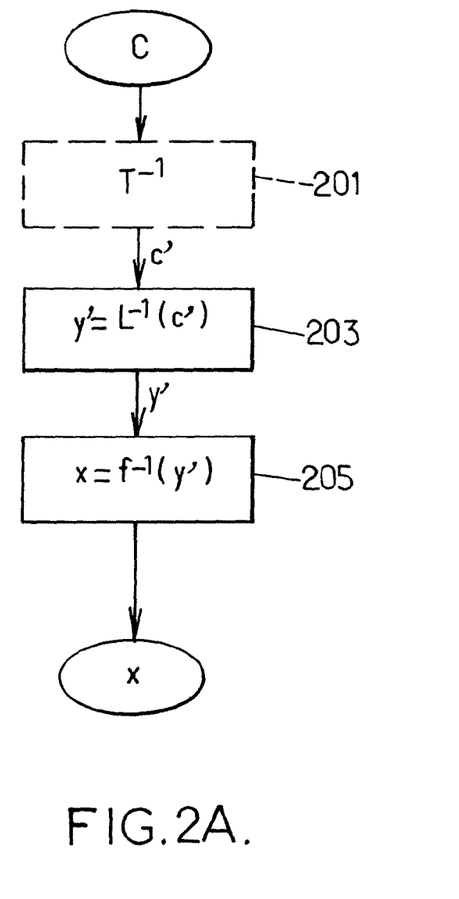
FIGS. 2A, 2B illustrate a decryption method according to a first embodiment of the invention.

A decryption method associated with an encryption function using the functions f, L, E and T according to the first embodiment is described in conjunction with FIG. 2A.

During a first optional step 201, in the case where an advanced encryption function C according to equation (8) has been used to obtain the advanced encrypted datum c, the function $T^{-1}$, inverse of the concealment function T, is applied to the datum c to be decrypted, so as to obtain a basic encrypted datum c', according to the following equation:

$$c' = T^{-1}(c) \quad (9)$$

After this optional step 201, a decoding function $L^{-1}$, corresponding to the coding function L making up the encryption function, is applied to the basic encrypted datum c', in the course of a step 203. Such a decoding function associates with the datum c' an intermediate datum y, ridded of the error component induced by the function E. This step 203 is the first step in the case where the datum to be decrypted has been simply encrypted by means of the basic encryption function h.

Finally, during a following step 205, the function $f^{-1}$, inverse of the first function f, is applied to the intermediate datum y so as to obtain a decrypted datum x.

Figure 2B:
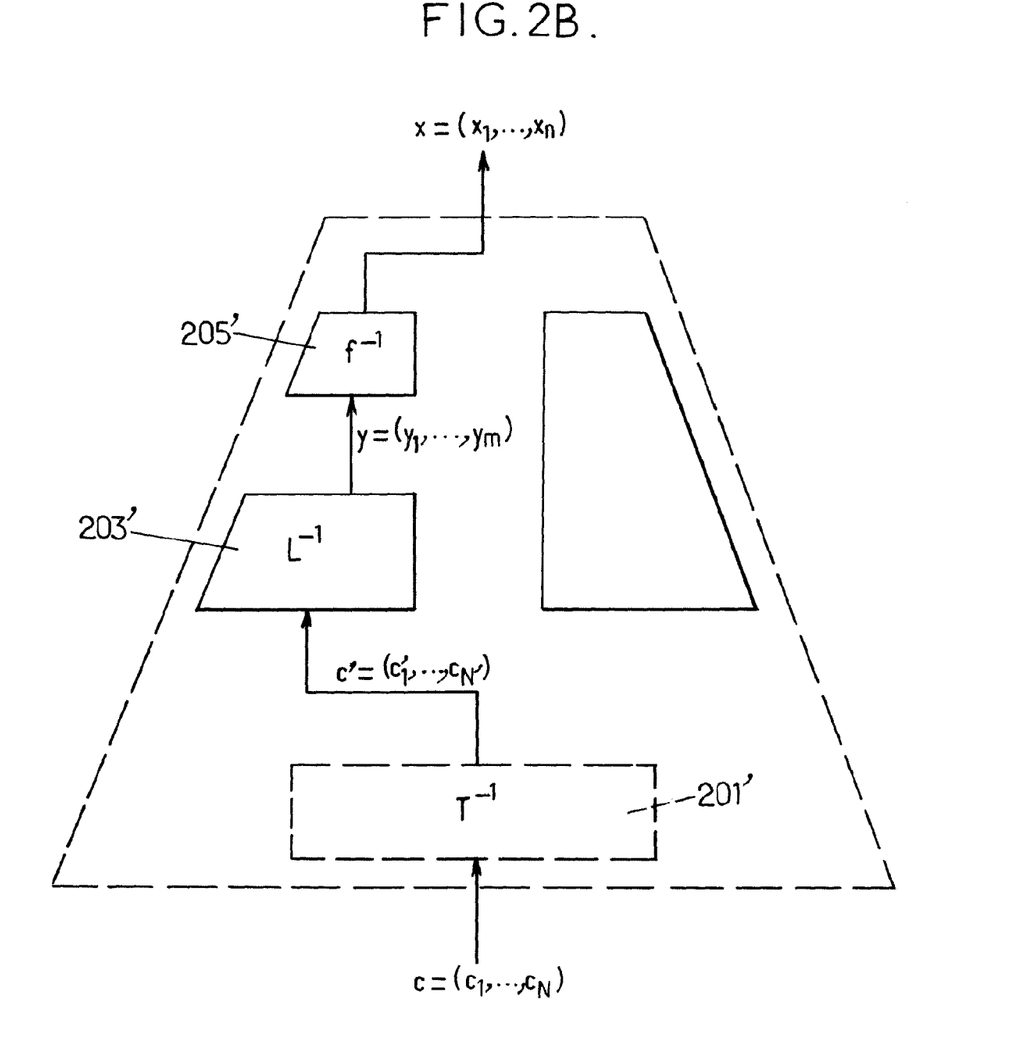

The principle of this decryption according to a first embodiment is illustrated another way in FIG. 2B, based on the encryption function illustrated in FIG. 1. In this FIG. 2B, the indications 201', 203' and 205' correspond respectively to steps 201, 203 and 205 described hereinabove and serve to reference the steps of the method of FIG. 2A with respect to the functions applied successively to the datum to be decrypted, so as to show how the decryption according to a first embodiment makes it possible to get back to the datum x.

It is apparent, in this FIG. 2B, that with respect to the global encryption function illustrated in FIG. 1, this first decryption embodiment uses the left branch of the encryption function to retrieve the initial datum x with the help of the basic encrypted datum c or the advanced encrypted datum c. Such a first embodiment can be likened to a traditional decoding, with which the impact of the component e, that may be considered to be an error induced by the function E in the encrypted datum, is removed by virtue of the redundancy introduced by the coding function L.

In a second embodiment, a variant of the first embodiment, it is also possible to use the right branch of the encryption function illustrated in FIG. 1 to get back to the initial datum x with the help of the encrypted datum. In such a second embodiment, the function f is not necessarily reversible and may be random, this representing a great advantage in cryptographic terms.

Figure 3A:
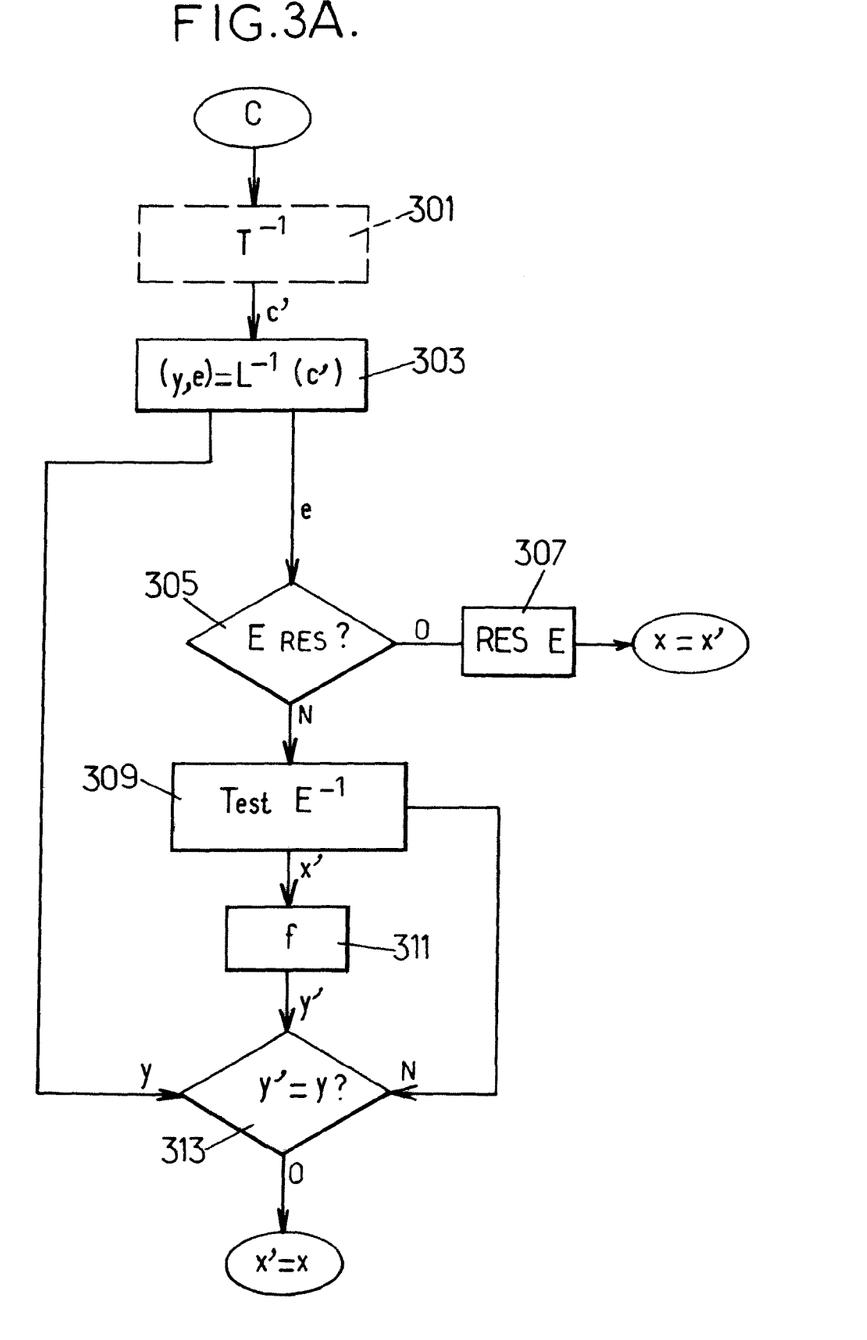
FIGS. 3A-3C illustrate a decryption method according to a second embodiment of the invention.

FIG. 3A illustrates the decryption method according to this second embodiment.

During a first optional step 301, in the case where an advanced encryption function C according to equation (8) has been used, the function $T^{-1}$, inverse of the concealment function T, is applied to the advanced encrypted datum c to be decrypted, so as to obtain a basic encrypted datum c', according to equation (9).

Thereafter, during a step 303 of decoding by applying the decoding function $L^{-1}$ to the datum c' (which may be the first step in the case of a basic encryption), a first intermediate datum y is obtained, satisfying c'=L(y)+e. The knowledge of c', y and L then makes it possible to deduce a second intermediate datum e satisfying e=c'−L(y), which corresponds to a component that may be regarded as an error which would be induced by the function E.

This intermediate datum e will then be used, during step 305, to retrieve an original datum x'. Accordingly, it is necessary to be able to invert the function E, this not being immediate, since the latter is of a random nature.

It is necessary to determine, during a step 307, whether or not the function E can be solved so as to be able to invert it. The ability to invert the function E will in fact depend on the expansion of this function.

As already seen, the expression "expansion of a function f", symbolized by Exp(f), is commonly used to refer to the ratio i/j of the number i of variables output by this function (for a system f of polynomials $f_i$, the number of polynomials $f_i$ as defined for example in equation (1)) to the number of variables input to this function (for a datum x, the number of components $x_i$). It was specified hereinabove that Exp(f)=m/n, Exp(L)=N/m and Exp(E)=N'/n.

If it is considered here that the function E is a random quadratic polynomial system of N' functions $e_i$ according to equation (4), inverting the system E amounts to solving a system with a large number of variables.

However, a particular choice of the function E can make it possible to solve such a system. If the function E consists of a multiplication of a plurality of mutually linear functions, that is to say if:

$$E = \prod_i l_i \tag{10}$$

it is then possible to control the probability P(e≠0) that E provides a nonzero value.

By considering the nonlimiting example where E is a quadratic system corresponding to the multiplication of two random linear functions, such that the probability P(l1) and P(l2) that each of the functions provides a nonzero datum is equal to ½, as for example on GF(2), then the probability of having a nonzero datum e equals:

$$P(e \neq 0) = P(l_1) * P(l_2) = \frac{1}{4} \tag{11}$$

In a quarter of cases, each of the linear functions l1 and l2 equals one, thus providing two linear equations to be solved for each component, i.e. 2*N'/4 linear equations for the system as a whole. If this number 2*N'/4 is greater than or equal to the number n of variables $x_i$, the system can be solved with a good probability, this being equivalent to the following condition, to solve the system E:

$$\text{Exp}(E) = \frac{N'}{n} \geq 2 \tag{12}$$

If this condition is fulfilled, it is possible to solve the equation system for the function E directly during a step 309, thereby making it possible to invert the function E and to obtain the decrypted datum x, by application of the inverse function of E to the second intermediate datum e.

Figure 3B:
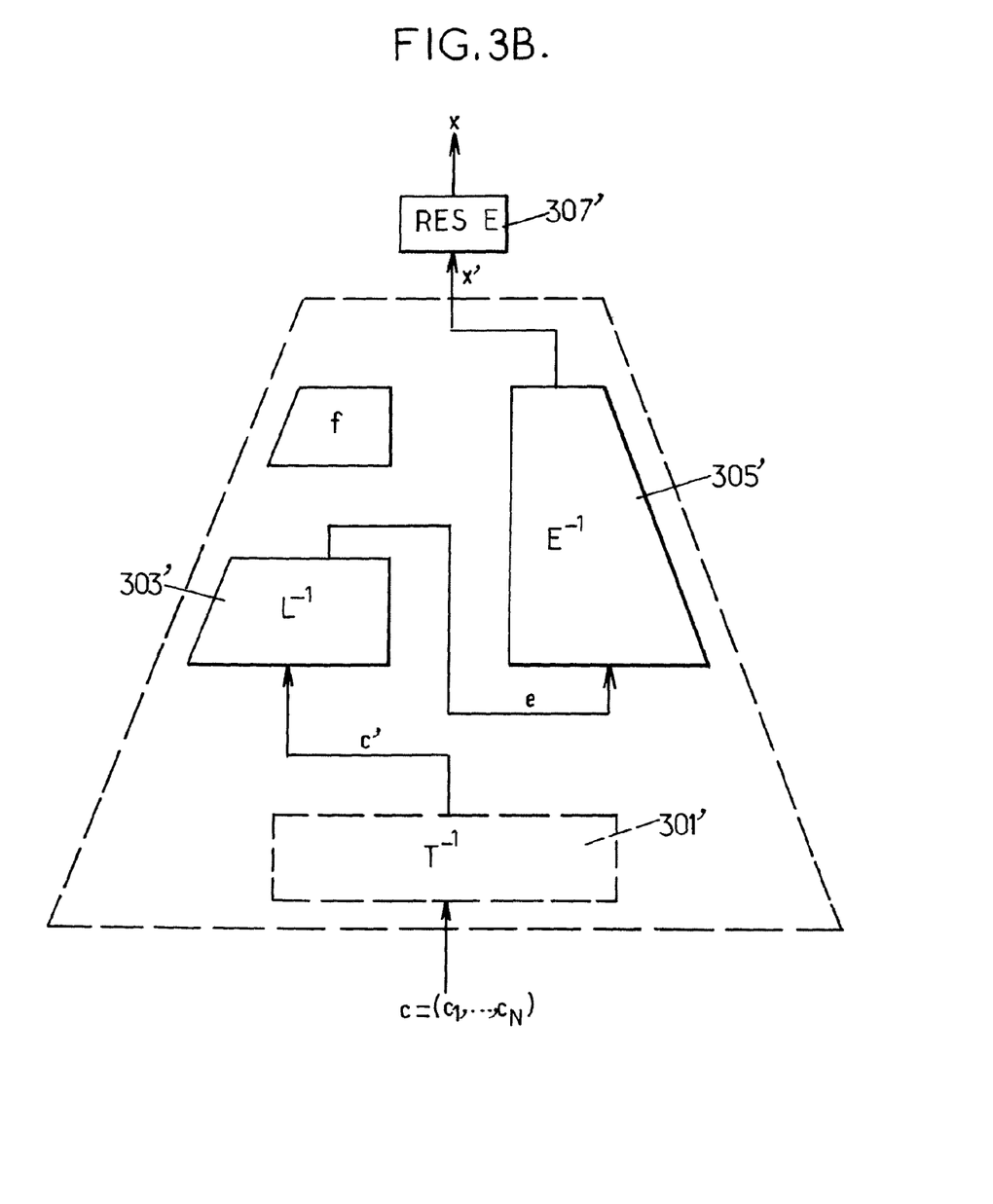

This first case is illustrated another way in FIG. 3B, based on the encryption function illustrated in FIG. 1. In this FIG. 3B, the indications 301', 303', 305' and 307' correspond respectively to steps 301, 303, 305 and 307 described hereinabove and serve to reference the steps of the method of FIG. 3A with respect to the functions applied successively to the datum to be decrypted c, so as to show how the decryption according to the second embodiment, in the case where the system E may be solved, makes it possible to get back to the datum x.

It is apparent, in this FIG. 3B, that with respect to the global encryption function illustrated in FIG. 1, this first decryption embodiment uses a part of the left branch and the right branch of the encryption function so as to retrieve the initial datum x from the basic encrypted datum c' or the advanced encrypted datum c.

If, on the other hand, the condition for solving E directly is not fulfilled, because of an insufficient expansion or on account of the fact that certain linear equations making up E are not independent, it will not be possible for the system E to be solved completely and a certain number of unknown variables will remain.

In such a case, the possibility then remains of doing successive tests on the variables, that is to say of making an assumption about these variables, of applying to the datum e the inverse function of E corresponding to this assumption so as to obtain a candidate datum x', during a step 309 illustrated in FIG. 3A.

At this juncture, the intermediate datum y as decoded is still available. It then suffices, during a step 311, to apply the function f to the candidate datum x' and to compare the result y' with the intermediate datum y in the course of a comparison step 313. The following equation is then verified:

$$y'=f(x')=y \quad (13)$$

If this equation is satisfied, the candidate datum x' does indeed correspond to the datum x initially encrypted. If conversely this equation is not satisfied, the candidate original datum x' is not the correct datum initially encrypted, and we return to step 309 where a new assumption is made about the unsolved variables of the system E. Steps 309-313 will then be repeated, until a candidate datum is found making it possible to satisfy equation (13).

Figure 3C:
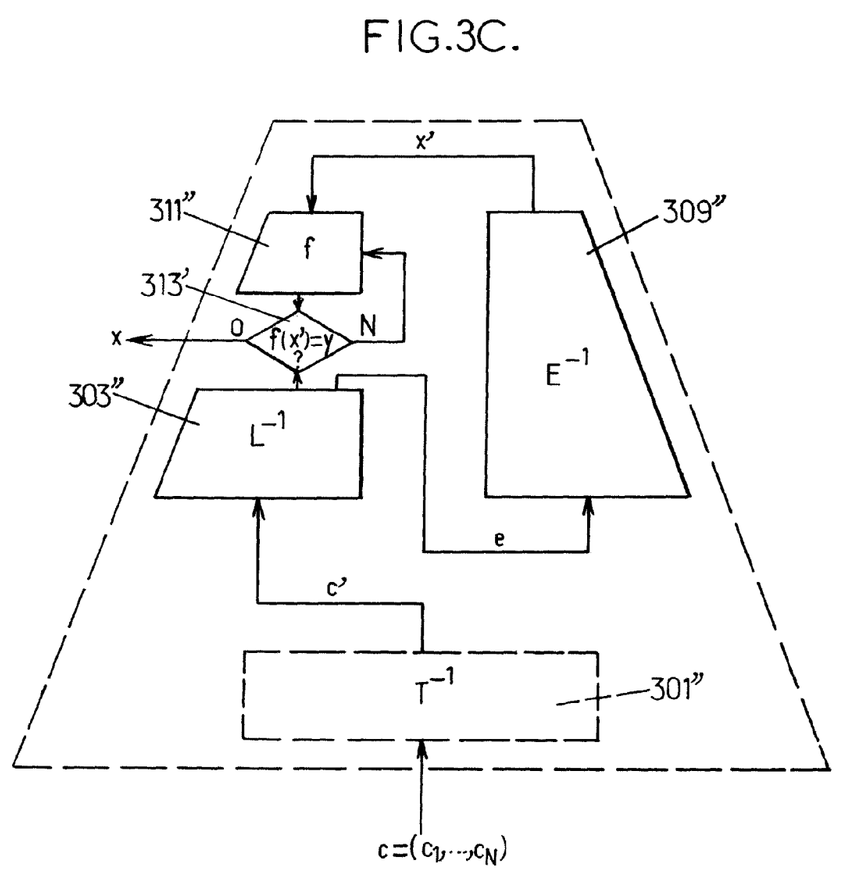

The principle of this decryption in this case is illustrated another way in FIG. 3C, based on the encryption function illustrated in FIG. 1. In this FIG. 3C, the indications 301", 303", 309", 311" and 313" correspond respectively to steps 301, 303, 309, 311 and 313 described hereinabove and serve to reference the steps of the method of FIG. 3A with respect to the functions applied successively to the datum to be decrypted c, so as to show how the decryption according to the second embodiment, in the case where the system E cannot be solved directly, makes it possible to get back to the datum x.

It is apparent, in this FIG. 3C, that with respect to the global encryption function illustrated in FIG. 1, this mode of decryption uses the right branch and the left branch, in two stages, of the encryption function so as to retrieve the initial datum x from the basic encrypted datum c' or the advanced encrypted datum c.

In these first two embodiments, the ability of the decoding function $L^{-1}$ to retrieve the intermediate datum y with certainty depends on the resistance to noise of the code L employed and on the impact of the component introduced by the function E, considered to be noise in the present case, during the addition 107. A traditional error-correcting code, for example, has a threshold error rate, related to a higher or lower probability of having nonzero noise, below which it can be guaranteed that the decoded datum is indeed the datum which was initially coded.

The more this threshold is exceeded, the more the uncertainty in the decoded value increases, this resulting in the existence not of a single value decoded with certainty, but of a number of possible decoded values increasing as a function of the increase in the probability of having noise.

In the present case, the component e introduced by the function E during encryption can be likened to the noise of a transmission system, and the probability that e is different from 0, higher or lower according to the function E, will influence the decoding by the function $L^{-1}$, in particular the number of potential decoded data y. If the probability $P(e\neq 0)$ that the datum e derived from the function E is different from 0 is sufficiently low, that is to say if the noise implied by the function E remains sufficiently low, the decoding will be effective and the decoded datum y will be the correct value. There is a threshold value P(L,E) of the probability $P(e\neq 0)$, dependent on the type of coding function L and the function E employed, below which it is possible to guarantee the uniqueness of the decoded datum y.

Stated otherwise, if $P(e\neq 0)\leq P(L,E)$, the coding L will be injective and the decoding by the function $L^{-1}$ will give the unique intermediate datum y, that can thereafter make it possible to retrieve the datum x by application of the function $f^{-1}$. In such a case, the first and second embodiments, as described hereinabove and in FIGS. 2A-2B and 3A-3C, make it possible to obtain the datum x.

If, on the other hand, $P(e\neq 0)>P(L,E)$, the decoding by the function $L^{-1}$ will give a series of intermediate data y(i). There will therefore be uncertainty about the valid intermediate datum in this series, all the more when the series is large, and this will be all the more the case when the noise probability $P(e\neq 0)$ is high.

In such a case, it is then possible to use encryption and decryption methods according to a third embodiment. In this third embodiment it is no longer necessary for the function f to be invertible; on the other hand the function E must be invertible.

Figure 4A:
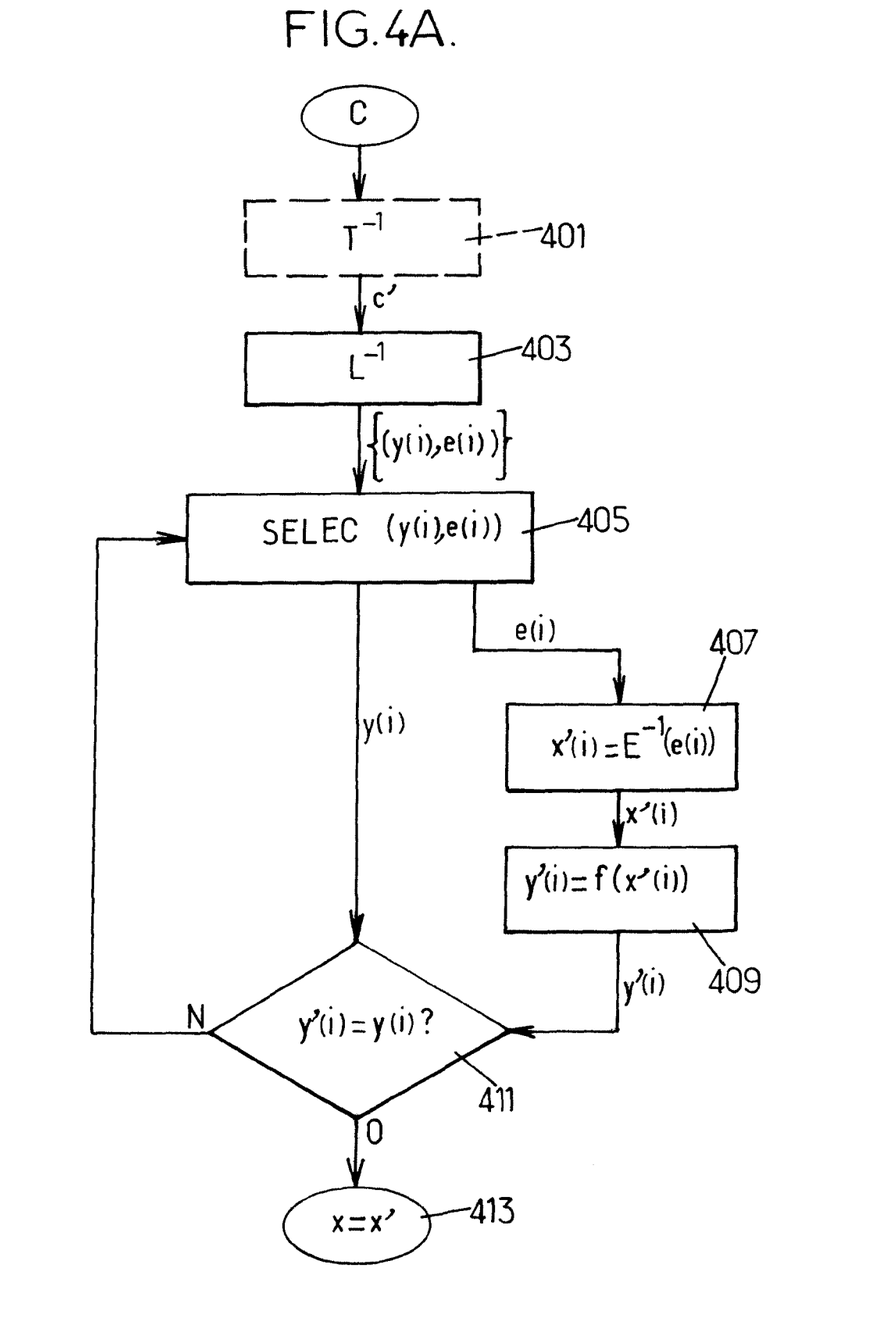
FIGS. 4A, 4B illustrate a decryption method according to a third embodiment of the invention.

A decryption method according to this third embodiment is illustrated in FIG. 4A.

During a first optional step 401, in the case where an advanced encryption function C according to equation (8) has been used, the function $T^{-1}$, inverse of the concealment function T, is applied to the advanced encrypted datum c to be decrypted, so as to obtain a basic encrypted datum c', according to equation (9).

During a decoding step 403, by application of the decoding function $L^{-1}$ to the datum c' (which may be the first step in the case of a basic encryption), a list of first candidate elements y(i) is obtained, satisfying c'=L(y(i))+e(i). Such a step 403 may be carried out by virtue of an appropriate algorithm, and is characteristic of a list-based decoding. As for each element y(i), it is possible to deduce the corresponding second element e(i) by e(i)=c'-L(y(i)), in fact, a list of pairs of elements {(y(i),e(i))} is determined in the course of this step 403, the size of which list will be dependent on the coding function L employed and on the probability $P(e\neq 0)$ of the function E.

Once this list of potential pairs of elements {(y(i),e(i))} has been defined, a step 405 of selecting a first pair (y(i),e(i)) from this list takes place.

During a step 407, a candidate original datum x'(i) is computed by application, of the inverse function of the function E to the second element e(i), corresponding to y(i), according to the following equation:

$$x'(i)=E^{-1}(e(i)) \quad (14)$$

Next, during a step 409, the function f is applied to the candidate original datum x'(i), so as to obtain an intermediate datum y'(i) such that y'(i)=f(x'(i)).

At this juncture of the method, a candidate original datum x'(i), its image y'(i) under the function f and a first candidate element y(i) have been obtained, all corresponding to the pair (y(i),e(i)) selected during step 407.

It is then necessary to verify, during a verification step 411, the following equation:

$$y'(i)=f(x'(i))=y(i) \quad (15)$$

If this equation (15) is satisfied, then the candidate original datum x'(i) corresponds to the initially encrypted datum x and the decryption is successful, as indicated in step 413 of FIG. 4A.

If this equation (15) is not satisfied, the candidate original datum x'(i) does not correspond to the initially encrypted datum x, and we return to the selection step 405 where the following pair (y(i+1),e(i+1)) is selected from the list of potential pairs defined in step 403. Steps 405-411 will then be repeated, until a candidate datum x'(i) is found making it possible to satisfy equation (15).

With such an embodiment, the function f does not necessarily have to be invertible, since it is the function f itself which is used in the course of step 409, and not its inverse.

To obtain the list of candidate intermediate data in the course of step 403, it is possible to use a list decoding algorithm associated with the coding function used during the composition of the encryption function, such as for example a list decoding algorithm of a Reed-Solomon code. Thus for a given coding function L, and for a datum c', such an algorithm will provide a list of data y'(i) having a fairly good probability of complying with the previous equations. The effectiveness of such a method obviously depends on the level of noise contributed by the error function E. Although this embodiment supports a greater noise ratio than the first embodiment introduced previously, it will remain effective only below a certain noise ratio threshold. However, such an embodiment makes it possible to relax the constraints on the code L itself and to use for example error-correcting codes whose expansion Exp(L) is relatively small.

Figure 4B:
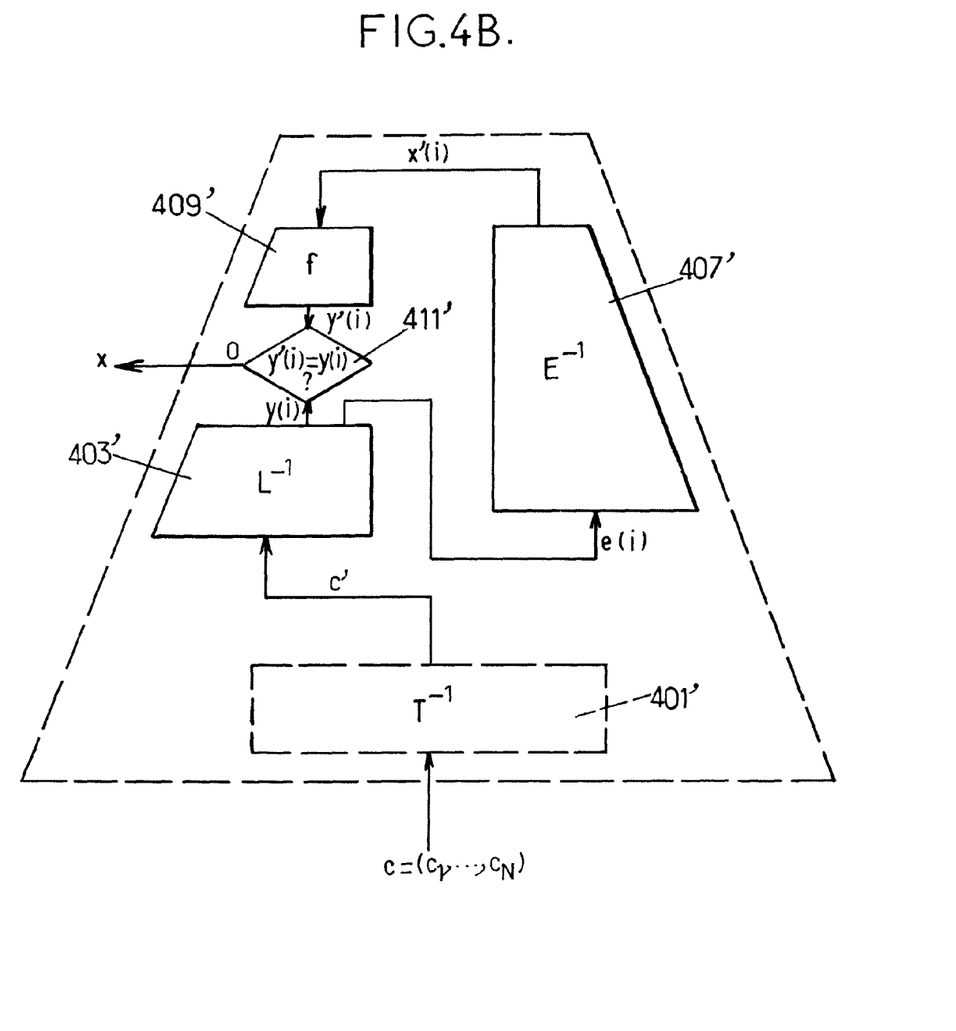

The principle of this decryption associated with this third embodiment is illustrated another way in FIG. 4B, still based on FIG. 1, with respect to the functions used during encryption. In this FIG. 4B, steps 401', 403', 407', 409' and 411' correspond respectively to steps 401, 403, 407, 409 and 411 described hereinabove and are referenced with respect to the functions applied successively to the datum to be decrypted.

It is apparent, in this FIG. 4B, that with respect to the global encryption function illustrated in FIG. 1, this third embodiment of the decryption also uses both the left branch, in two stages, and right branch to retrieve the initial datum x with the help of the basic encrypted datum c' or the advanced encrypted datum c.

Figure 5A:
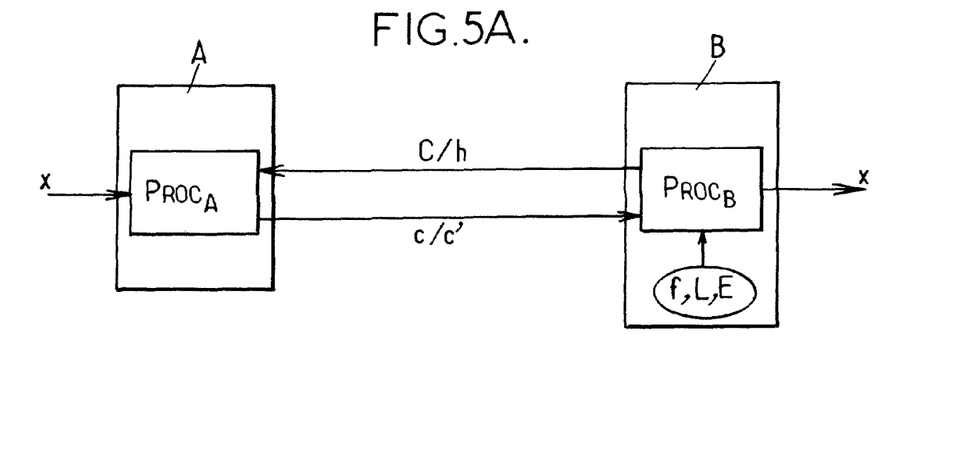
FIG. 5A illustrates an asymmetric cryptographic transmission system using the encryption function according to an embodiment of the present invention as public key.

FIG. 5A illustrates an asymmetric cryptographic transmission system using the encryption function according to an embodiment of the present invention.

Such a system comprises a first entity A, commonly called a "verifier", which communicates with a second entity B, commonly called a "prover".

The second entity B comprises a computation module $PROC_B$ capable of generating a basic public function h or an advanced public function C, as described hereinabove and in FIG. 1. Public functions such as these can serve as public key in an asymmetric cryptography system; the public key may be made available to the first entity A, so that the latter uses it to encrypt a datum x to be transmitted to the second entity B. For example, the public key is transmitted from the first entity A to the second entity B. On its side, the prover B retains in memory the functions f, L and E (and optionally T in the case of an advanced public key) used to generate the public key, these functions then corresponding to the secret key held by the prover B.

The first entity A comprises, on its side, a computation module $PROC_A$ capable of receiving the public function C or h, as well as at least one datum x to be encrypted, and of computing a basic encrypted datum c', or advanced encrypted datum c, corresponding respectively to the application of the basic function h, or of the advanced function C, to the datum x.

This encrypted datum c or c' can then be processed by the computation module $PROC_B$ of the prover B, by means of the secret key, that is to say of the functions f, L and E (and optionally T in the case of an advanced public key), according to a decryption method as previously described, to successfully retrieve the datum x. The latter will therefore have been transmitted in a secure manner from the verifier to the prover.

Figure 5B:
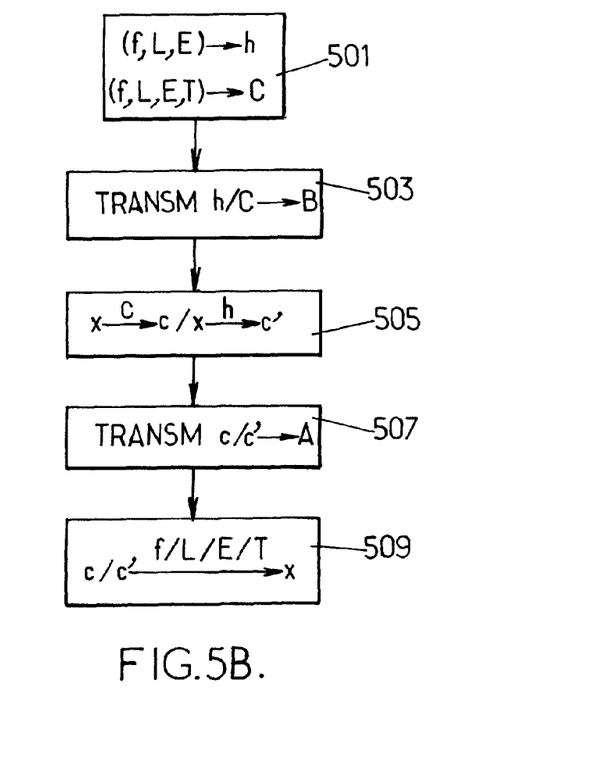
FIG. 5B illustrates a method of encrypted transmission according to an embodiment of the present invention.

FIG. 5B illustrates the method of encrypted transmission according to an embodiment of the present invention, employed by a cryptographic system as described in conjunction with FIG. 5A.

In a first step (501) of generation of a public key, the computation module $PROC_B$ of the prover B generates a basic public function h from a first function f, a second function E and a coding function L as described hereinabove, or an advanced public function C from these same functions and a concealment function T as described hereinabove.

The public function h or C, acting as public key, is then transmitted in the course of a step 503, to the verifier A.

The computation module $PROC_A$ of the verifier A then encrypts the datum x to be transmitted into an encrypted datum c' by means of the basic public function h, respectively into an encrypted datum c by means of the advanced public function C, in the course of an encryption step 505.

The advanced encrypted datum c, or basic encrypted datum c', is then transmitted to the prover B, in the course of a step 507.

Finally, during a decryption step 509, the encrypted datum received by the prover B is decrypted by virtue of the secret key retained by the prover B. In the case of a basic encryption, the basic encrypted datum c' is decrypted by means of at least one of the functions f, L and E, according to one of the decryption embodiments presented hereinabove. In the case of an advanced encryption, the encrypted datum c is decrypted by means of at least one of the functions f, L and E, as well as of the function T, according to one of the decryption embodiments presented hereinabove.

The method of encrypted transmission, illustrated by FIG. 5B, can advantageously be extended so as to carry out an authentication of the prover B with the verifier A. Indeed, the prover B which desires to authenticate itself must be capable of proving its identity to the verifier A. By using the method of encrypted transmission as described in conjunction with FIG. 5B, the verifier A transmits the advanced encrypted datum c, respectively the basic encrypted datum c', to the prover B. The encrypted datum c, c' received is then decrypted by the prover B by means of the secret key that it retains. In a step specific to authentication, the prover B sends the datum x thus decrypted to the verifier A. The verifier A is then assured of the identity of the prover B since only the prover B is capable of decrypting the datum x encrypted for its attention.

Although the present disclosure has been described with reference to one or more examples, workers skilled in the art will recognize that changes may be made in form and detail without departing from the scope of the disclosure and/or the appended claims.

The invention claimed is:

1. A method for performing a cryptographic task on at least one numerical datum, said method comprising:
   a step of at least partial use of a cryptographic function in an electronic hardware component as an asymmetric cryptographic public key, wherein the cryptographic function comprises a basic encryption function obtained by the addition between:
      an intermediate function derived from composition of an error-correcting coding function with a first function, wherein the first function is a polynomial function of degree $d_f$ greater than or equal to two,
      and a second function, wherein the second function is a polynomial function of degree $d_E$ greater than or equal to two;

a step of converting between the at least one numeric datum and at least one encrypted numeric datum by applying the cryptographic function.

2. The method for performing a cryptographic task as claimed in claim 1, wherein the cryptographic function comprises an improved encryption function obtained by composition of a concealment function with said basic encryption function.

3. The method for performing a cryptographic task as claimed in claim 1, wherein the degree $d_f$ of the first polynomial function and the degree $d_E$ of the second polynomial function have the same value.

4. The method for performing a cryptographic task as claimed in claim 1, wherein the intermediate function and the second function have the same expansion.

5. The method for performing a cryptographic task as claimed in claim 1, wherein the second function comprises a multiplication of a plurality of linear functions.

6. The method for performing a cryptographic task as claimed in claim 1, in which the cryptographic task comprises an encryption of the at least one datum, and wherein said step of converting comprises a step of encrypting the at least one numeric datum into the at least one encrypted numeric datum by said encryption function.

7. The method for performing a cryptographic task as claimed in claim 1, in which the cryptographic task comprises a decryption of the at least one encrypted numeric datum, and wherein said step of converting comprises the following steps:
  decoding the at least one encrypted numeric datum into at least one intermediate datum by way of a decoding function associated with the error-correcting coding function; and
  applying an inverse function of the first function to the at least one intermediate datum so as to obtain at least one decrypted datum.

8. The method for performing a cryptographic task as claimed in claim 1, in which the task comprises a decryption of the at least one encrypted numeric datum, and wherein said step of converting comprises the following steps:
  obtaining at least one intermediate datum by application of a decoding function, associated with the error-correcting coding function, to the at least one encrypted numeric datum;
  applying the inverse function of the second function to the at least one intermediate datum so as to obtain at least one decrypted datum.

9. The method for performing a cryptographic task as claimed in claim 1, in which the task comprises a decryption of the at least one encrypted numeric datum, which comprises the following steps:
  determination, by application of a decoding function, associated with the error-correcting coding function, to the at least one encrypted numeric datum, of a plurality of potential pairs of elements;
  selection of a new pair of elements from among said plurality of potential pairs;
  computation of a candidate datum by application of an inverse function of the second function to the second element of the selected potential pair;
  computation of an intermediate datum by application of the first function to the candidate datum;
  comparison of the first element of the selected pair with the intermediate datum;
  if the first element and the intermediate datum are identical, determination of at least one decrypted datum on the basis of the candidate datum;
  if the first element and the intermediate datum are different, return to the step of selection for selection of a new pair of elements from among said plurality of potential pairs.

10. The method for performing a decryption of an encrypted datum as claimed in claim 7, wherein the method comprises a preliminary step of applying an inverse function of a concealment function to an improved encrypted datum so as to obtain a basic encrypted datum to be decrypted.

11. The method for performing a cryptographic task as claimed in claim 7, in which the task comprises an authentication, by a first entity, of an encrypted message sent by a second entity.

12. A method for generating an asymmetric cryptography public key, comprising the following steps:
  composition of a first function with an error-correcting coding function so as to obtain an intermediate function, wherein the first function is a polynomial function of degree $d_f$ greater than or equal to two;
  addition of a second function to said intermediate function with an electronic hardware component so as to obtain a basic public encryption function usable as the asymmetric cryptographic public key, wherein the second function is a polynomial function of degree $d_E$ greater than or equal to two; and
  transmitting the asymmetric cryptographic public key from the electronic hardware component to another entity.

13. The method of claim 12 and further comprising fabricating an advanced asymmetric cryptography public key, wherein fabricating comprises:
  a step of composition of a concealment function with the basic public encryption function obtained by the step of addition.

14. A cryptographic device comprising:
  an electronic hardware device comprising a computation module configured to use a cryptographic function as an asymmetric cryptographic public key, which comprises a basic encryption function obtained by the addition between:
    an intermediate function derived from composition of an error-correcting coding function with a first function, wherein the first function is a polynomial function of degree $d_f$ greater than or equal to two; and
    a second function, wherein the second function is a polynomial function of degree $d_E$ greater than or equal to two; and
  wherein the computation module is further configured to convert between the at least one numeric datum and at least one encrypted numeric datum by applying the cryptographic function.

15. The method for performing a decryption of an encrypted datum as claimed in claim 8, wherein the method comprises a preliminary step of applying an inverse function of a concealment function to an improved encrypted datum so as to obtain a basic encrypted datum to be decrypted.

16. The method for performing a decryption of an encrypted datum as claimed in claim 9, wherein the method comprises a preliminary step of applying an inverse function of a concealment function to an improved encrypted datum so as to obtain a basic encrypted datum to be decrypted.

17. The method for performing a cryptographic task as claimed in claim 8, in which the task comprises an authentication, by a first entity, of an encrypted message sent by a second entity.

18. The method for performing a cryptographic task as claimed in claim 9, in which the task comprises an authentication, by a first entity, of an encrypted message sent by a second entity.

19. The method for performing a cryptographic task as claimed in claim 10, in which the task comprises an authentication, by a first entity, of an encrypted message sent by a second entity.

* * * * *